United States Patent [19]

Stoffel

[11] 4,193,096
[45] Mar. 11, 1980

[54] HALF TONE ENCODER/DECODER

[75] Inventor: James C. Stoffel, Rochester, N.Y.

[73] Assignee: Xerox Corporation, Stamford, Conn.

[21] Appl. No.: 784,206

[22] Filed: Apr. 4, 1977

[51] Int. Cl.² .............................................. H04N 1/00
[52] U.S. Cl. .................... 358/260; 358/133; 358/138
[58] Field of Search .............. 358/133, 260, 261, 138; 340/146.3 MA, 146.3 H

[56] References Cited

U.S. PATENT DOCUMENTS

| | | | |
|---|---|---|---|
| 3,462,547 | 8/1969 | Macovski | 358/133 |
| 3,573,789 | 4/1971 | Sharp | 340/146.3 H |
| 3,769,453 | 10/1973 | Bahl et al. | 358/260 |
| 3,980,809 | 9/1976 | Cook | 358/260 |
| 4,013,828 | 3/1977 | Judice | 358/133 |
| 4,028,731 | 6/1977 | Arps et al. | 358/260 |
| 4,047,152 | 9/1977 | Giuliamo et al. | 340/146.3 MA |
| 4,144,547 | 3/1979 | Stoffel | 358/260 |
| 4,150,400 | 4/1979 | Wong | 358/138 |

*Primary Examiner*—Robert L. Griffin
*Assistant Examiner*—Edward L. Coles

[57] ABSTRACT

A system for compressing or compacting scanned image data is disclosed. The system electronically subdivides the image data pixel pattern into quadrants and predictively encodes pictorial data by predicting, from the established image values of adjoining quadrants, an image value for each quadrant. The predicted image value is then compared with the established image value and the magnitude of the error, if any, determined. The error, if any, is then encoded to provide a relatively highly compressed description of the image suitable for transmittal, storage, and the like.

10 Claims, 10 Drawing Figures

FIG. 2

| | | | | | |
|---|---|---|---|---|---|
| ④ | ⑤ | ⑥ | ⑥ | ⑦ | ⑧ |
| ④ | ④ | ⑤ | ⑥ | ⑦ | ⑧ |
| ④ | ⑤ | ⑤ | ⑥ | ⑦ | ⑧ |
| ③ | ④ | ⑤ | ⑥ | ⑦ | ⑧ |
| ③ | ④ | ⑤ | ⑥ | ⑦ | ⑧ |
| ③ | ④ | ⑤ | ⑥ | ⑦ | ⑧ |

| 1 | 5 | 18 | 19 | 11 | 3 |
|---|---|---|---|---|---|
| 9 | 17 | 25 | 31 | 23 | 7 |
| 21 | 29 | 33 | 35 | 27 | 15 |
| 14 | 25 | 34 | 36 | 32 | 24 |
| 6 | 22 | 30 | 28 | 20 | 12 |
| 2 | 10 | 18 | 16 | 8 | 4 |

| 0 | 1 | 1 | 1 | 1 | 0 |
|---|---|---|---|---|---|
| 1 | 1 | 1 | 1 | 1 | 0 |
| 1 | 1 | 1 | 1 | 1 | 1 |
| 1 | 1 | 1 | 1 | 1 | 1 |
| 1 | 1 | 1 | 1 | 1 | 1 |
| 0 | 1 | 1 | 1 | 1 | 0 |

17, 18

FIG. 6
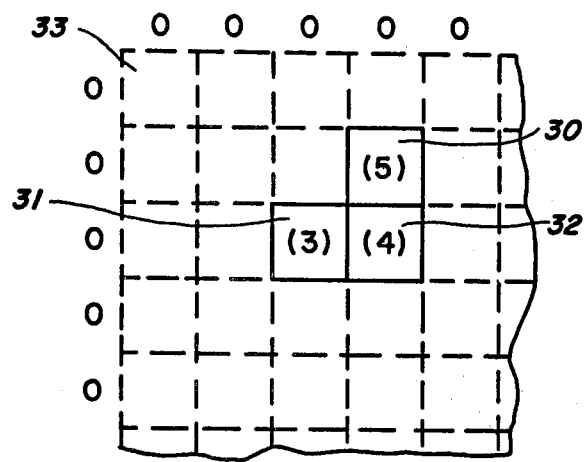
FIG. 7
FIG. 8
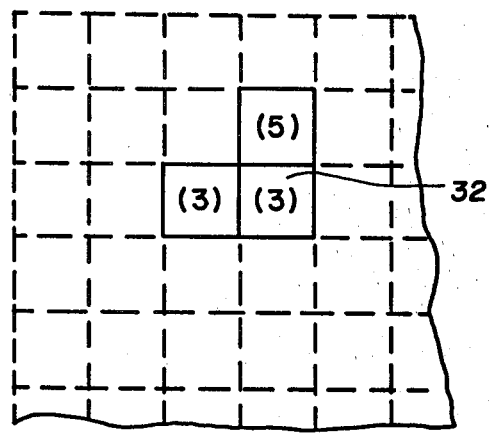

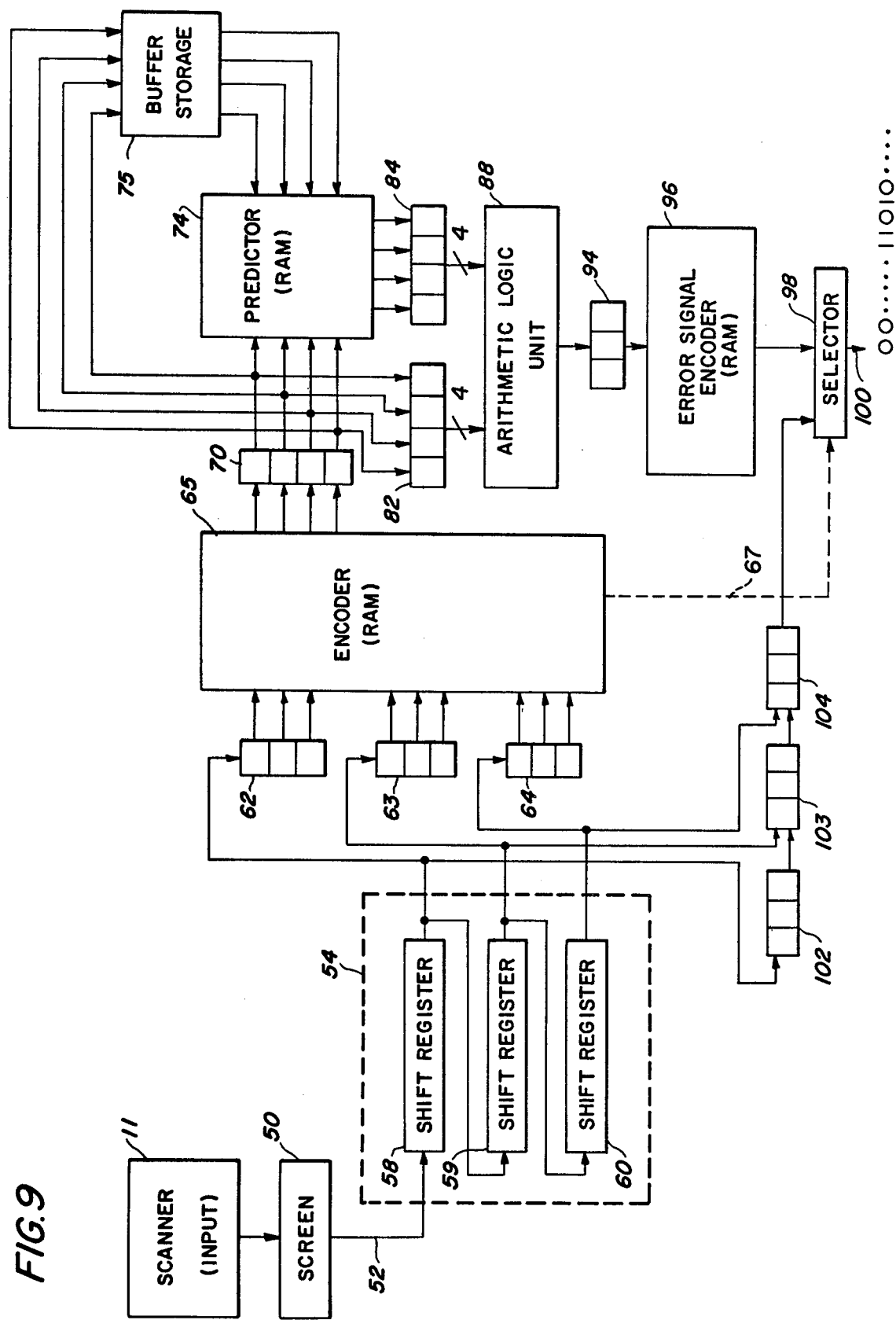

HALF TONE ENCODER/DECODER

This invention relates to a system for compressing or compacting image data, and more particularly, to a system for compressing image data utilizing predictive encoding.

Pictorial information may be converted to binary data for various operating purposes as for example, to enhance transmittal of the pictorial information from one location to another, for storage purposes etc. If the data can also be compressed or compacted, certain highly desirable advantages accrue. For example, the amount of time required for transmittal of the data from one location to another can be greatly reduced. Additionally, existing data storage facilities can also be used more efficiently.

While therefore substantial benefits arise from data compaction, high data compaction ratios are of no avail if the pictorial information represented by the compressed data, is distorted or inaccurate. Optimumly, the highest compaction ratio without distortion of the original data is required.

It is therefore a principal object of the present invention to provide a new and improved system for pictorial data compression.

It is an object of the present invention to provide a system for accurately compacting pictorial data utilizing improved predictive encoding techniques.

It is an object of the present invention to provide method and apparatus for reducing storage/bandwidth required to store pictorial data.

It is an object of the present invention to provide a relatively simple and improved all digital system for accurately encoding a picture using a reduced number of data pixels.

It is an object of the present invention to provide a new and improved process for converting pictorial data into coded form for transmittal and storage having reduced bandwidth.

This invention relates to a system for compressing pixel data representative of an image, comprising in combination, means for scanning an original document to produce an image pixel pattern representative of the image on the document; means for screening the image pixel pattern to produce binary pixel data representative of the image pixel pattern; means for arbitrarily subdividing the binary pixel data into a succession of discrete areas, each of the discrete areas being of predetermined size; means for establishing an image value for the discrete areas; predictor means for predicting the image value of each discrete area from the established image value of at least one adjacent discrete area; comparator means for comparing the predicted image value of each discrete area with the established image value for the discrete area; error code generating means for generating an error code representative of the degree of error found by the comparator means; and encoding means for encoding the output of the error code generating means to produce a compressed representation of the image.

This invention further relates to a method of compressing a stream of digital data representative of an image, the steps comprising, scanning an original document to produce a pixel pattern representative of the image on the document; screening the image pixel pattern to convert the image pixel pattern from an analog pixel pattern to a binary pixel pattern; subdividing the binary pixel pattern into a succession of discrete areas each containing a preset number of digital bits; establishing an image value for the discrete areas; predicting the image value for the discrete areas from the established image value of at least one adjoining area; comparing the predicted image value of each discrete area with the established image value of that area and generating an error signal representative of the size of the error between predicted and established image values; and encoding the error signals to provide a stream of digital signals representative of the image.

Other objects and advantages will be apparent from the ensuing description and drawings in which:

FIG. 2 is an example of the output from the scanner of FIG. 1 pixel values;

FIG. 3 is an example of a ½ tone screen function with threshold values;

FIG. 4 is an illustration showing the result of screening the scanner output of FIG. 2 with the screen of FIG. 3;

FIG. 6 illustrates exemplary established image values for the scanner output of FIG. 2 following screening using the quadrant bit sequence of FIG. 5a;

FIG. 7 illustrates an exemplary quadrant image value prediction;

FIG. 8 illustrates an exemplary established image value for the predicted quadrant of FIG. 7; and FIG. 9 is a block diagram of the encoder/decoder apparatus of the present invention.

Figure 1:
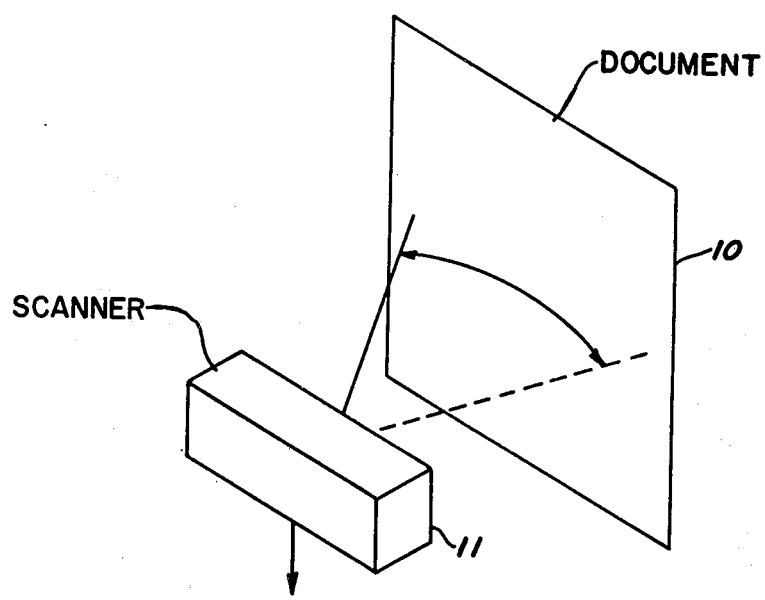
FIG. 1 is an isometric view of a scanner for generating a pixel pattern representative of an image.

In the ensuing description, pixel refers to a picture element which may be defined as a scaler value of the gray scale of an image at a particular point of the image.

Referring to FIGS. 1-9 of the drawings, there is shown graphically the preferred steps that comprise the image data compressing system of the present invention. Initially, an original document 10 is scanned by a suitable line scanner 11 to produce pixel patterns 12 representative thereof. The value of the pixels as will be understood by those skilled in the art provides a gray scale representation of the image scanned. Exemplary pixel values are illustrated in FIG. 2, which for purposes of explanation may be considered as voltage levels.

The image pixel patterns 12 are screened electronically, the screen being illustrated herein by a template 16 of predetermined size and predetermined thresholds. A typical threshold pattern is shown in FIG. 3. Application of the threshold pattern of FIG. 3 to the pixel pattern 12 of FIG. 2 produces the binary pixel pattern 17 of FIG. 4. As will be understood, threshold values and patterns other than that illustrated may be contemplated.

Figure 5A:
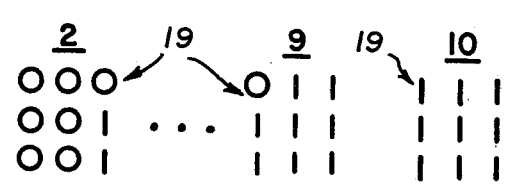
FIG. 5a is a schematic view of a predetermined quadrant template sequence.

To facilitate encoding of the image data and to reduce complexity, template 16 is in effect subdivided into discrete areas such as quadrants 18. The binary image pixel patterns 17 in quadrants 18 are compared with a predetermined quadrant template pixel patterns 19 18' such as shown in FIG. 5a, each pixel pattern 19 having a numerical value (herein termed established quadrant image values QV) assigned thereto. Matching of an actual binary image pixel pattern 17 with a template pixel pattern 19 produces the established quadrant image value QV therefor. See FIG. 6 for example.

Figure 5B:
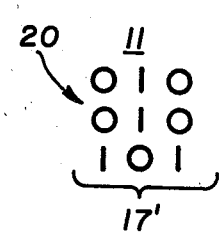
FIG. 5b is an example of a quadrant nontemplate.

A quadrant pixel pattern not falling in the pixel sequence 19 in FIG. 5a, as for example the quadrant pixel pattern 17' of FIG. 5b, is defined as a nontemplate pixel pattern 20. As can be understood, the use of quadrant templates and nontemplates pixel patterns 19, 20 reduces the number of potential image values, on a per quadrant basis, to 11, 10 quadrant template pixel pattern 19 and one quadrant nontemplate pixel pattern 20.

With the screened image pixel pattern 17 established for each quadrant, an image code is generated using quadrant prediction and comparison. Referring to FIG. 7, the image value of quadrant templates 18 are predicted on a per quadrant basis using the established image values of adjoining quadrants according to the following relationship:

$\overline{QV} = f(QV_1, QV_2)$ where $\overline{QV}$ represents the predicted quadrant image value, and QV represents the established quadrant image value.

In the example shown in FIG. 7, quadrant 30 ($QV_1$) has a real image value of 5, and quadrant 31 ($QV_2$) an image value of 3. The predicted image value ($\overline{QV}$) for the adjoining quadrant 32 is 4.

Following quadrant image value prediction, the established image value (QV) for each quadrant is compared with the predicted image value ($\overline{QV}$) of the quadrant in accordance with the following relationship:

$e = QV - \overline{QV}$ wherein e represents the error

In the example shown, the established image value (QV) for quadrant 32 is 3 (see FIG. 8), the predicted image value ($\overline{QV}$) is 4. The error (e) in this case would be −1.

In the case where the quadrant borders the image margin, such as quadrant 33 in FIG. 5, the areas outside the image margin are presumed to have a preset image value. In the example shown, the image value for the area outside the image margin is assumed to be zero.

The error signal so determined may be encoded using the code set out in Table I, the encoded image data together with unencoded nontemplate image data representing the original image 10 scanned in the form of a relatively highly compressed data stream. The image may thereafter be exactly reconstructed from the data by reversing the aforedescribed process.

TABLE I

| ERROR VALUE | CODE |
|---|---|
| 0 | 0 |
| +1 | 10 |
| −1 | 110 |
| +2 | 11101 |
| −2 | 11110 |
| +3 | 111001 |
| −3 | 1111100 |
| +4 | 1111101 |
| −4 | 1111110 |
| +5 | 1111111 |
| −5 | 11100000 |
| +6 | 11100010 |
| −6 | 111000010 |
| +7 | 111000111 |
| −7 | 1110000110 |
| +8 | 1110000111 |
| −8 | 1110001101 |
| +9 | 11100011001 |
| −9 | 111000110000 |
| +10 | 1110001100010 |
| −10 | 1110001100011 |

It is appreciated that other statistical encoders such as a run length encoder may be used instead to encode the aforedescribed error signal.

Referring to FIG. 9, image pixel data generated by scanner 11 is fed to screening device 50 wherein screen 16 subdivided into quadrant templates 18, is electronically superimposed onto the image pixel patterns 12. Screening device 50 is conventional as known to those skilled in the art. The screened data, in the form of a binary pixel pattern, is fed via data bus 52 to data storage unit 54. Storage unit 54 serves to progressively buffer the binary image data on a line by line basis to provide a three line quadrant output to row registers 62, 63, 64. Storage unit 54 incorporates series coupled line shift registers 58, 59, 60 operatively coupled to row registers 62, 63, 64 respectively.

The data output of registers 62, 63, 64 is fed to data reader and encoder 65. Encoder 65 comprises a random access memory (RAM) for mapping the actual image pixel patterns 17, 17' relative to the quadrant template patterns 19, 20. This establishes the actual quadrant image value (QV) of quadrant 18 and distinguishes template pixel patterns 19 from nontemplate pixel patterns 20 to provide, via control lead 67, a control signal to data output selector 98 as will appear.

The established quadrant image value (QV) from encoder 65 is fed via distributor register 70 to quadrant image predictor 74 and to scan line buffer storage 75. Buffer storage 75 holds the established quadrant image values pending use thereof as predictors for adjoining but succeeding quadrants, it being understood that encoder 65 operates on one quadrant line at a time. Predictor 74, which comprises a random access memory (RAM) predicts from the established image values of adjoining pairs of quadrants (i.e., quadrants 30, 31 in FIG. 6), a predicted quadrant image value ($\overline{QV}$) for each quadrant 18. The predicted quadrant image values ($\overline{QV}$) of predictor 74 are fed to holding register 84.

Established quadrant image values (QV) from encoder 74 are fed to holding register 82. Registers 82, 84 serve to synchronize the predicted and established quadrant image values (QV, $\overline{QV}$) for comparison purposes.

The established and predicted quadrant image values (QV, $\overline{QV}$) from registers 82, 84 are fed to arithmetic logic unit 88. Logic unit 88 compares the established quadrant image value (QV) with the predicted quadrant image value ($\overline{QV}$) and generates an error signal representative of the degree of error (e) if any, therebetween. The signal from logic unit 88 is fed to holding register 94 and thereafter inputted to encoder 96. Encoder 96 comprises a random access memory (RAM) programmed to transform the error signal into a coded output in accordance with the parameters set forth in Table I. The coded signal from encoder 96 is transmitted via selector 98 to output bus 100.

As described, nontemplate pixel patterns 20, i.e., data whose bit sequence is different from the quadrant bit pattern programmed for, may occur. Image data in this category is transmitted via line serializing shift registers 102, 103, 104 directly to data output selector 98. The nontemplate quadrant data, on a control signal from encoder 65, is placed on output bus 100 in corrent line synchronization with the encoded error signals.

As will be understood, the compressed data may be used to reconstruct the original image by reversing the herein described process. More particularly, the encoded error signal may be decoded using Table I in reverse to provide an error signal, the value of which represents the magnitude of the error between the established quadrant image value (QV) and the predicted quadrant image value ($\overline{QV}$). With the image values of the areas outside the image margin preset (i.e., zero), the predictive process may be reversed to determine the established quadrant image values. Using the established quadrant image values and the template/nontemplate quadrant pixel sequence of FIGS. 5a and 5b, the quadrant pixel pattern is exactly determined. This results in a binary representative of the original image.

While the invention has been described with reference to the structure disclosed, it is not confined to the details set forth, but is intended to cover such modifications or changes as may come within the scope of the following claims.

What is claimed is:

1. In a predictive encoding system for compressing pixel data representative of an image, comprising in combination:
    means for scanning an original document to produce an image pixel pattern representative of the image on the document;
    means for screening the image pixel pattern to produce binary pixel data representative of the image pixel pattern;
    means for arbitrarily subdividing the binary pixel data into a succession of discrete areas, each of the discrete areas being of predetermined size;
    means for establishing a numerical value representative of the pixel image pattern for each of said discrete areas;
    predictor means for predicting a numerical value for said discrete areas from the established numerical value of at least one adjacent discrete area;
    comparator means for comparing the predicted numerical value of each discrete area with the established numerical value for the discrete area;
    error code generating means for generating an error code representative of the degree of error found by the comparator means; and
    encoding means for encoding the output of the error code generating means to produce a compressed representation of the image.

2. The system according to claim 1 in which said predictor means predicts the discrete area image value from the established numerical value of two adjoining discrete area quadrants.

3. The system according to claim 1 wherein a preset base boundary value is assigned to areas outside the margins of said image for comparison purposes.

4. A method of compressing a stream of digital data representative of an image, the steps comprising:
    scanning an original document to produce a pixel pattern representative of the image on the document;
    screening the image pixel pattern to convert the image pixel pattern from an analog pixel pattern to a binary pixel pattern;
    subdividing the binary pixel pattern into a succession of discrete areas each containing a preset number of digital bits;
    establishing an image value for the discrete areas;
    predicting the image value for the discrete areas from the established image value of at least one adjoining area;
    comparing the predicted image value of each discrete area with the established image value of that area;
    generating an error signal representative of the size of the error between predicted and established image values; and
    encoding the error signals to provide a stream of digital signals representative of the image.

5. The data compressing method of claim 4 including the steps of:
    decoding the encoded signals to provide said error signals;
    establishing from the decoded error signals the image value for said discrete areas;
    determining from the established image values the binary pixel patterns for said discrete areas; and
    descreening said binary pixel patterns to provide a pixel pattern representative of said image for reproducing said image.

6. The data compressing method of claim 4 including the step of establishing the image value for said discrete areas by comparing the binary pixel patterns of said discrete areas with preset pixel patterns, each of said preset pixel patterns representing an established image pattern.

7. The method of compressing a stream of pixel data representative of an image, the steps consisting of:
    screening said pixel data to provide binary pixel data;
    forming said binary pixel data into discrete areas of preset pixel size;
    establishing an image value for said discrete areas;
    predicting the image value for said discrete areas from the established image value of at least one adjoining area;
    comparing the predicted image value of said discrete areas with the established image values thereof;
    generating an error signal representative of the magnitude of the error in said predicted image values; and
    encoding said error signals to provide a compressed signal representative of the image.

8. The method according to claim 7 including the step of predicting the image value of said discrete areas from the established image value of at least two adjoining areas.

9. The method according to claim 7 including the step of establishing the image value for said discrete areas by comparing the binary pixel data in said discrete areas with pre-established area pixel patterns having preset image values assigned thereto.

10. The method according to claim 7 including the steps of:
    decoding said compressed signals to provide said error signals; and
    establishing from said error signals the binary image value for said discrete areas representative of said image.

* * * * *